United States Patent
Baek et al.

(10) Patent No.: US 11,222,646 B2
(45) Date of Patent: Jan. 11, 2022

(54) APPARATUS AND METHOD FOR GENERATING AUDIO SIGNAL WITH NOISE ATTENUATED BASED ON PHASE CHANGE RATE

(71) Applicant: Samsung Electronics Co., Ltd., Gyeonggi-do (KR)

(72) Inventors: Soonho Baek, Gyeonggi-do (KR); Hangil Moon, Gyeonggi-do (KR); Beakkwon Son, Gyeonggi-do (KR); Jaemo Yang, Gyeonggi-do (KR); Kiho Cho, Gyeonggi-do (KR); Juntai Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/769,675

(22) PCT Filed: Dec. 18, 2018

(86) PCT No.: PCT/KR2018/016121
§ 371 (c)(1),
(2) Date: Jun. 4, 2020

(87) PCT Pub. No.: WO2019/156339
PCT Pub. Date: Aug. 15, 2019

(65) Prior Publication Data
US 2021/0174819 A1  Jun. 10, 2021

(30) Foreign Application Priority Data
Feb. 12, 2018 (KR) .................. 10-2018-0016752

(51) Int. Cl.
*G10L 21/0232* (2013.01)
*G06N 3/04* (2006.01)
(Continued)

(52) U.S. Cl.
CPC ............ *G10L 21/0232* (2013.01); *G06N 3/04* (2013.01); *G10L 25/18* (2013.01); *G10L 25/30* (2013.01);
(Continued)

(58) Field of Classification Search
CPC ............ G10L 21/0232; G10L 21/0272; G10L 21/0216; G10L 21/028; G10L 21/0208;
(Continued)

(56) References Cited

U.S. PATENT DOCUMENTS

| 8,954,324 B2 | 2/2015 | Wang et al. |
| 9,305,567 B2 | 4/2016 | Visser et al. |

(Continued)

FOREIGN PATENT DOCUMENTS

| EP | 2 201 563 B1 | 10/2011 |
| KR | 10-1340757 B1 | 1/2014 |
| WO | 2017/176941 A1 | 10/2017 |

OTHER PUBLICATIONS

Guangji Shi et al.; "Adaptive time-frequency data fusion for speech enhancement"; Information Fusion, 2003. Proceedings of the Sixth International Conference of, IEEE, Jul. 8, 2003; pp. 394-399; XP032457546.

(Continued)

*Primary Examiner* — Yogeshkumar Patel
(74) *Attorney, Agent, or Firm* — Cha & Reiter, LLC

(57) ABSTRACT

An electronic device is disclosed. In addition, various embodiments recognized through the specification are possible. The electronic device includes a plurality of input devices for receiving a plurality of input signals, each of which includes a speech signal and a noise signal and a processor electrically connected with the input devices. The processor is configured to determine a signal to noise ratio (SNR) value for the plurality of input signals for each (Continued)

frequency band, determine a first parameter indicating a phase shift to frequency in the plurality of input signals in a first frequency band where the SNR value is greater than or equal to a specified threshold, determine a second parameter indicating a phase shift to frequency in the plurality of input signals in a second frequency band where the SNR value is less than the threshold, and perform beamforming for the plurality of input signals based on the first parameter and the second parameter.

15 Claims, 9 Drawing Sheets

(51) Int. Cl.
| | |
|---|---|
| G10L 25/18 | (2013.01) |
| G10L 25/30 | (2013.01) |
| G10L 25/51 | (2013.01) |
| H04R 1/40 | (2006.01) |
| H04R 3/00 | (2006.01) |
| G10L 21/0216 | (2013.01) |

(52) U.S. Cl.
CPC .............. *G10L 25/51* (2013.01); *H04R 1/406* (2013.01); *H04R 3/005* (2013.01); *G10L 2021/02166* (2013.01)

(58) Field of Classification Search
CPC ... G10L 21/02082; G10L 25/30; G10L 25/18; G10L 25/51; G10L 25/21; G10L 25/81; G10L 2021/02166; G10L 2021/02165; H04R 3/005; H04R 1/406; G06N 3/04
See application file for complete search history.

(56) References Cited

U.S. PATENT DOCUMENTS

| | | | |
|---|---|---|---|
| 9,378,754 B1* | 6/2016 | Every | .................. G10L 21/0208 |
| 9,521,486 B1 | 12/2016 | Barton | |
| 9,858,946 B2 | 1/2018 | Sugiyama et al. | |
| 2013/0282372 A1 | 10/2013 | Visser et al. | |
| 2013/0282373 A1 | 10/2013 | Visser et al. | |
| 2017/0140774 A1 | 5/2017 | Hashimoto et al. | |
| 2018/0033447 A1* | 2/2018 | Ramprashad | ....... G10L 21/0216 |

OTHER PUBLICATIONS

Yousefian Nima et al.; "A coherence-based algorithm for noise reduction in dual-microphone applications" European Signal Processing Conference, IEEE, Aug. 23, 2010; pp. 1904-1908; XP032770695.
European Search Report dated Feb. 3, 2021.

* cited by examiner

APPARATUS AND METHOD FOR GENERATING AUDIO SIGNAL WITH NOISE ATTENUATED BASED ON PHASE CHANGE RATE

CROSS-REFERENCE TO RELATED APPLICATION(S)

This application is a National Phase Entry of PCT International Application No. PCT/KR2018/016121, which was filed on Dec. 18, 2018 and claims priority to Korean Patent Application No. 10-2018-0016752, which was filed on Feb. 12, 2018, the contents of which are incorporated herein by reference.

TECHNICAL FIELD

Embodiments disclosed in the disclosure relates to an apparatus and method for generating an audio signal, noise of which is attenuated, based on a phase change rate according to a change in a frequency of the audio signal.

BACKGROUND ART

An electronic device may receive a speech signal via a plurality of input devices such as microphones. When a noise signal together with a speech signal is introduced into the input device, call quality or a speech recognition rate of the electronic device may be reduced. The electronic device may perform beamforming entailing hardware or software processing to remove the noise signal from an input signal (or an audio signal) in which the speech signal and the noise signal are mixed. The beamforming may include an operation of controlling such that input devices have directionality for a location of a sound source of a speech signal by compensating for a time delay and/or a phase delay between speech signals received via the input devices. The electronic device may strengthen a speech signal and may remove or attenuate a noise signal among input signals received via input devices by controlling directionality of the input devices through beamforming.

DISCLOSURE

Technical Problem

Beamforming may include, for example, signal independent beamforming and signal dependent beamforming. When performing the signal independent beamforming, an electronic device may compensate for a phase delay between speech signals based on distance information between input devices and direction information of speech signals introduced into the input devices. Through the signal independent beamforming, the electronic device may perform beamforming without being affected from a signal to noise ratio (SNR). However, when the direction information of the speech signals is changed (e.g., when a user who utters a speech signal is changed in location), a problem in which performance of beamforming is degraded may occur. Furthermore, when the electronic device performs the signal independent beamforming indoors, linearity of a phase difference between input signals introduced into input devices may be lost due to reverberation of the signal to reduce accuracy of beamforming.

When performing the signal dependent beamforming, the electronic device may compensate for a phase delay between speech signals based on covariance information of input signals and noise signals, which are introduced into input devices. Through the signal dependent beamforming, the electronic device may perform beamforming without being affected from the direction information and the reverberation of the speech signal. However, because accuracy of covariance information is reduced due to a noise signal in an environment where an SNR is low, a problem where performance of beamforming is reduced may occur.

Various embodiments of the disclosure are to provide an apparatus for improving performance of signal dependent beamforming in a frequency band where an SNR is low and a method thereof.

Technical Solution

In accordance with an aspect of the disclosure, an electronic device is provided. The electronic device may include a plurality of input devices configured to receive a plurality of input signals, each of which includes a speech signal and a noise signal and a processor electrically connected with the input devices. The processor may be configured to determine an SNR value for the plurality of input signals for each frequency band, determine a first parameter indicating a phase shift to frequency in the plurality of input signals in a first frequency band where the SNR value is greater than or equal to a specified threshold, determine a second parameter indicating a phase shift to frequency in the plurality of input signals in a second frequency band where the SNR value is less than the threshold, based on the first parameter, and perform beamforming for the plurality of input signals based on the first parameter and the second parameter.

In accordance with another aspect of the disclosure, an electronic device is provided. The electronic device may include a first microphone, a second microphone, and a processor. The processor may be configured to obtain a first audio signal using the first microphone and obtain a second audio signal using the second microphone, identify a specified frequency band where an SNR belongs to a specified range in conjunction with the first audio signal and the second audio signal, determine a first change rate at which the first audio signal and the second audio signal vary in phase with frequency in the specified frequency band, estimate a second change rate, at which the first audio signal and the second audio signal vary in phase with frequency in a frequency band different from the specified frequency band, based at least on the first change rate, determine a first weight corresponding to the first audio signal and a second weight corresponding to the second audio signal based at least on the first change rate and the second change rate, and generate a third audio signal, a noise signal of which is attenuated, using the first audio signal and the second audio signal, based at least on the first weight and the second weight.

In accordance with another aspect of the disclosure, a method of an electronic device is provided. The method may include receiving a plurality of input signals, determining an SNR value for the plurality of input signals for each frequency band, determining a first parameter indicating a phase shift to frequency in the plurality of input signals in a first frequency band where the SNR value is greater than or equal to a specified threshold, determining a second parameter indicating a phase shift to frequency in the plurality of input signals in a second frequency band where the SNR value is less than the threshold, based on the first parameter, and performing beamforming for the plurality of input signals based on the first parameter and the second parameter.

Advantageous Effects

According to embodiments disclosed in the disclosure, the electronic device may improve performance of signal dependent beamforming in an environment where an SNR is low by adaptively performing the signal dependent beamforming based on an SNR value of an input signal.

According to embodiments disclosed in the disclosure, the electronic device may efficiently recognize a speech signal in an environment where a noise signal (e.g., car noise) is present by improving the performance of the signal dependent beamforming in the environment where the SNR is low.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to the accompanying drawings. However, it should be understood that this is not intended to limit the disclosure to specific implementation forms and includes various modifications, equivalents, and/or alternatives of embodiments of the disclosure.

Figure 1:
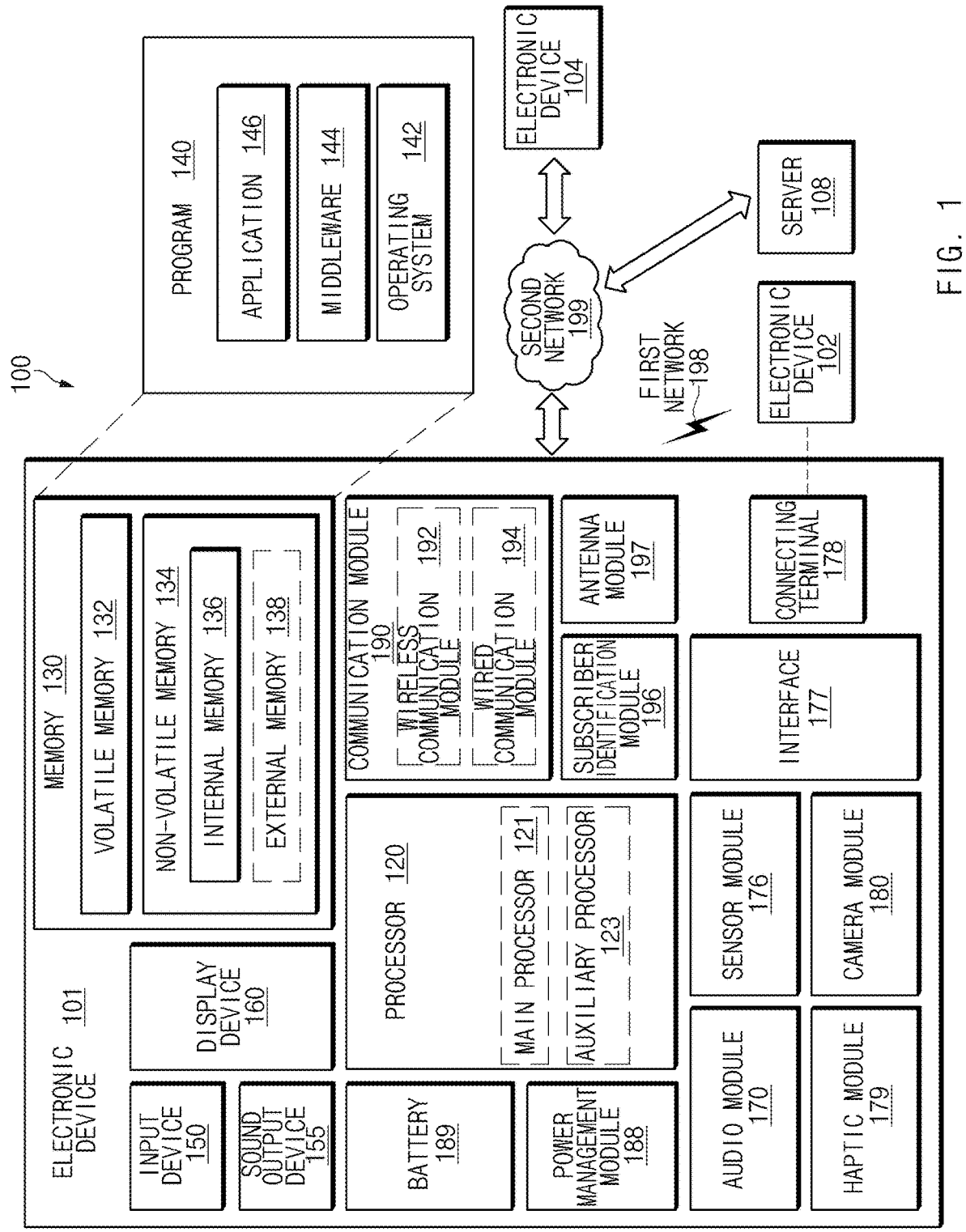
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
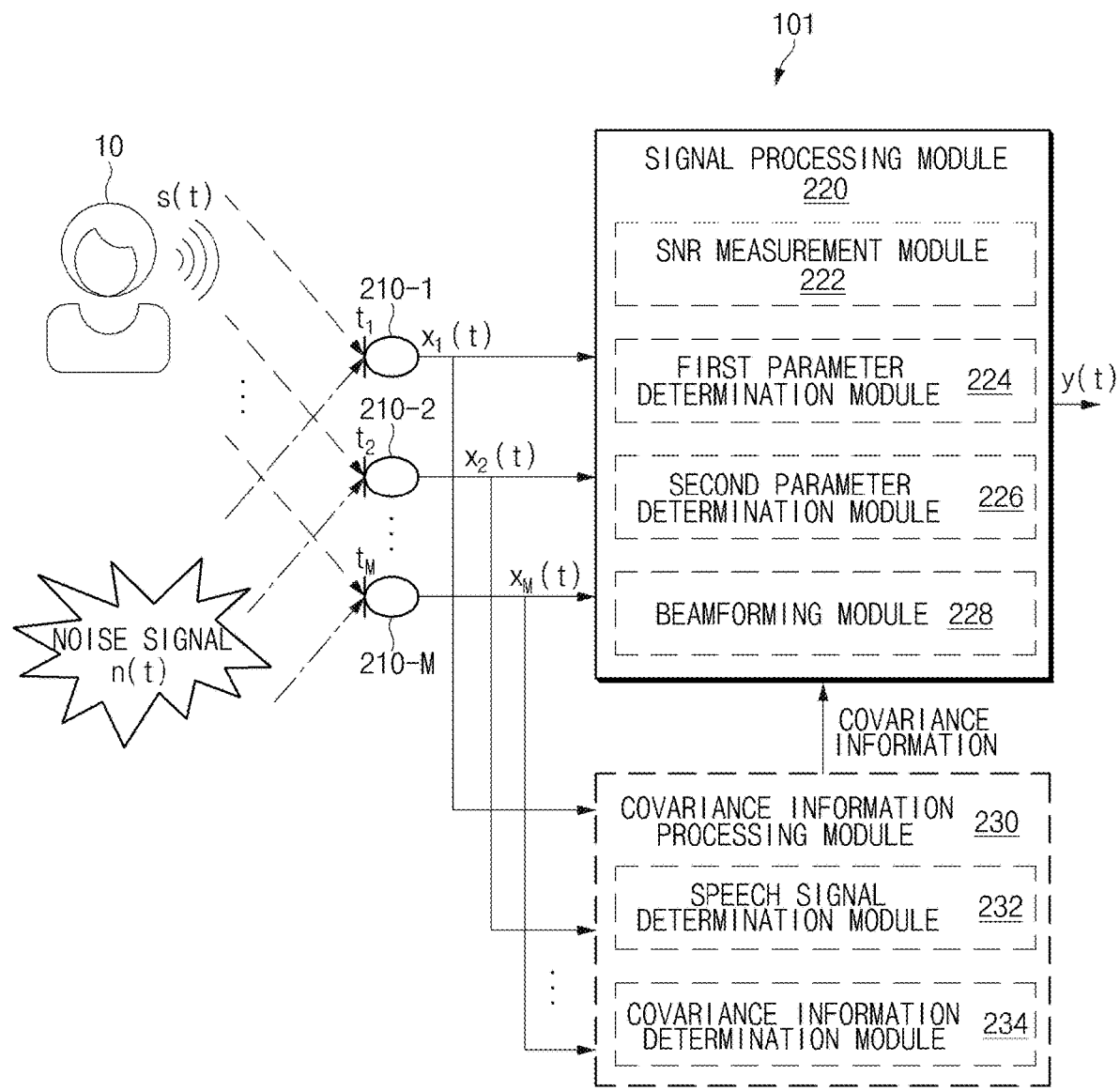
FIG. 2 illustrates a block diagram of an electronic device for performing signal dependent beamforming according to various embodiments.

FIG. 2 illustrates a block diagram of an electronic device for performing signal dependent beamforming according to various embodiments.

Referring to FIG. 2, an electronic device 101 may include a plurality of input devices 210-1, 210-2, . . . , and 210-M (e.g., an input device 150 of FIG. 1), a signal processing module 220, and a covariance information processing module 230. The components included in the electronic device 101 may not be limited to the example shown in FIG. 2. For example, the electronic device 101 may further include at least one of the components shown in FIG. 1, or may omit at least one of the components shown in FIG. 2.

According to an embodiment, the number of the plurality of input devices 210-1, 210-2, . . . , and 210-M may vary from 2 to M (where M is a natural number of 3 or more) with an implementation method. The plurality of input devices 210-1, 210-2, . . . , and 210-M may include, for example, a microphone (or a mike).

According to an embodiment, the plurality of input devices 210-1, 210-2, . . . , and 210-M may receive speech signals s(t) uttered from a user 10. Because the plurality of input devices 210-1, 210-2, . . . , and 210-M are arranged to be spaced apart from each other, speech signals generated at one sound source location may be received at different times in the plurality of different input devices 210-1, 210-2, . . . , and 210-M. For example, some of the speech signals may be received at time $t_1$ in the input device 210-1, some of the speech signals may be received at time $t_2$ in the input device 210-2, and the others may be received at time $t_M$ in the input device 210-M. When the user 10 is close to the input device 210-1 among the plurality of input devices 210-1, 210-2, . . . , and 210-M, time $t_1$ may be less than time $t_2$, . . . , or $t_M$. Speech signals received at different times may have different phases.

According to an embodiment, the plurality of input devices 210-1, 210-2, . . . , and 210-M may receive noise signals n(t) together with speech signals s(t). In a similar principle to the speech signals, because the noise signals are received at different times in the plurality of different input devices 210-1, 210-2, . . . , and 210-M, they may have different phases.

According to an embodiment, input signals $x_1(t)$, $x_2(t)$, . . . , and $x_M(t)$ may include speech signals and noise signals, which are received at different times via the input devices 210-1, 210-2, . . . , and 210-M. In the disclosure, the input signal may be referred to as an audio signal. For example, the input signal $x_i(t)$ received via the $i^{th}$ input device 210-$i$ (where i is a natural number between 1 and M) may be represented as Equation 1 below.

$$x_i(t)=s_i(t)+n_i \quad \text{[Equation 1]}$$

In Equation 1, $s_i(t)$ may denote a speech signal received via the $i^{th}$ input device 210-$i$ (where i is a natural number from 1 to M), and $n_i(t)$ may denote a noise signal received via the $i^{th}$ input device 210-$i$. Because speech signals received in different input devices have different phases and because noise signals received in different input devices have different phases, Equation 1 may be represented as Equation 2 below.

$$x_i(t)=s_1(t-t_{s,i})+n_1(t-t_{n,i}) \quad \text{[Equation 2]}$$

In Equation 2, $s^1(t-t_{s,i})$ may reflect a phase difference $t_{s,i}$, between the speech signal $s^1(t)$ received in the first input device 210-1 and the input signal $s_i(t)$ received in the $i^{th}$ input device 210-$i$. In the same principle, $n_1(t-t_{n,i})$ may reflect a phase difference $t_{n,i}$ between the noise signal $n_1(t)$ received in the first input device 210-1 and the noise signal $n_i(t)$ received in the $i^{th}$ input device 210-$i$.

According to an embodiment, the signal processing module 220 may beamform a first frequency where the measured SNR value is greater than or equal to a threshold based on a first parameter and may beamform a second frequency band where the measured SNR value is less than the threshold based on a second parameter. In the disclosure, the beamforming operation may refer to an operation where the electronic device 101 applies a weight to control directionality of input signals. In the disclosure, the parameter may indicate a phase shift in frequency for input signals. The electronic device 101 may attenuate noise signals included in input signals by applying a weight determined based on the parameter to the input signals. The parameter may be referred to as a change rate, a steering vector, or a blocking matrix.

According to an embodiment, the signal processing module 220 may include a software module or a hardware module, which performs a series of operations for performing beamforming. For example, the signal processing module 220 may be embedded in an audio module 170 of FIG. 1 and may be controlled by a processor (e.g., a processor 120 of FIG. 1). For another example, the processor (e.g., the processor 120 of FIG. 1) may include at least a part of the signal processing module 220. For another example, the signal processing module 220 may be stored in the form of instructions in a memory 130 of FIG. 1 and may be executed by the processor. The signal processing module 220 may include an SNR measurement module 222, a first parameter determination module 224, a second parameter determination module 226, and a beamforming module 228.

According to an embodiment, the SNR measurement module 222 may measure an SNR for input signals for each frequency band. The SNR measurement module 222 may identify whether the measured SNR value is greater than or equal to a specified threshold. In the disclosure, a frequency band where the SNR value is greater than or equal to the specified threshold may be referred to as a first frequency band, and a frequency band where the SNR value is less than the specified threshold may be referred to as a second frequency band. For example, in an environment with many noise signals, each of which has a low frequency band, such as car noise, the second frequency band may include a frequency band lower than the first frequency band. For another example, in an environment with many noise signals, each of which has a high frequency band, the second frequency band may include a frequency band higher than the first frequency band.

According to an embodiment, the first parameter determination module 224 may determine a first parameter for the first frequency band. The first parameter determination module 224 may determine the first parameter based on covariance information received from the covariance information processing module 230. In the disclosure, the covariance information may refer to a correlation between a plurality of speech signals or may refer to a correlation between a plurality of noise signals. The electronic device 101 may determine a sound source location (e.g., a phase or a direction) of a speech signal based on a correlation between speech signals. The covariance information may include, for example, a covariance vector or a covariance matrix.

According to an embodiment, the first parameter determination module 224 may determine a first parameter in various manners based on a type of signal dependent beamforming. The type of the signal dependent beamforming may include minimum variance distortionless response (MVDR) beamforming capable of minimizing a distortion of a speech signal by using a difference between a covariance matrix for the speech signal and a covariance matrix for a noise signal, max-SNR beamforming capable of improving an SNR of an input signal by using an inverse matrix of a covariance matrix for a noise signal and a covariance matrix for a speech signal, or generalized sidelobe canceler (GSC) beamforming capable of efficiently removing a noise signal by using a null space of an eigenvector used in a max-SNR beamformer.

According to an embodiment, the second parameter determination module 226 may determine a second parameter for the second frequency band. Because a result value of covariance information measured in the second frequency band where the SNR value is less than the threshold is lower in accuracy than a result value of covariance information in the first frequency band where the SNR value is greater than or equal to the threshold, the second parameter determination module 226 may estimate the second parameter from the first parameter determined in the first frequency band. The second parameter determination module 226 may determine the second parameter from the first parameter using, for example, linearity of a phase difference between channels (or frequencies) in the first frequency band. For another example, the second parameter determination module 226 may determine the second parameter from the first parameter based on a deep neural networks (DNN) model.

According to an embodiment, the beamforming module 228 may perform beamforming based on the first parameter and the second parameter. The beamforming module 228 may compensate for, for example, a phase difference (e.g., $t_{s,i}$ in Equation 2) between speech signals by applying weights determined based on the first parameter and the second parameter to input signals. When the beamforming is performed, the input signals $x_1(t), x_2(t), \ldots,$ and $x_M(t)$ may be output as a signal y(t), a noise signal of which is removed (or attenuated).

According to an embodiment, the covariance information processing module 230 may include a software module or a hardware module, which transmits covariance information used to determine the first parameter to the signal processing module 220. For example, the covariance information processing module 230 may be embedded in the audio module 170 of FIG. 1 to be controlled by the processor, or may be stored in the memory 130 of FIG. 1 in the form of instructions to be executed by the processor. For another example, the processor (e.g., the processor 120 of FIG. 1) may include at least a part of the covariance information processing module 230. The covariance information processing module 230 may include a speech signal determination module 232 and a covariance information determination module 234.

According to an embodiment, the speech signal determination module 232 may determine (or estimate) whether there is a speech signal in the received input signal or a probability that a speech signal will be present in the received input signal. For example, the speech signal determination module 232 may determine a speech signal in a frequency band (e.g., a first frequency band) using a speech presence probability (SPP) estimation algorithm used for noise suppression (NS) for one channel or complex Gaussian mixture model (CGMM) based estimation algorithm used for NS for a plurality of channels.

According to an embodiment, the covariance information determination module 234 may determine covariance information for the speech signal or covariance information for the noise signal, based on the speech signal determined by the speech signal determination module 232 and the input signal received via the input devices 210-1, 210-2, ..., and 210-M. The covariance information may include, for example, a covariance matrix $C_s(f)$ (f may denote a frequency) for a speech signal and a covariance matrix $C_n(f)$ for a noise signal.

Figure 3:
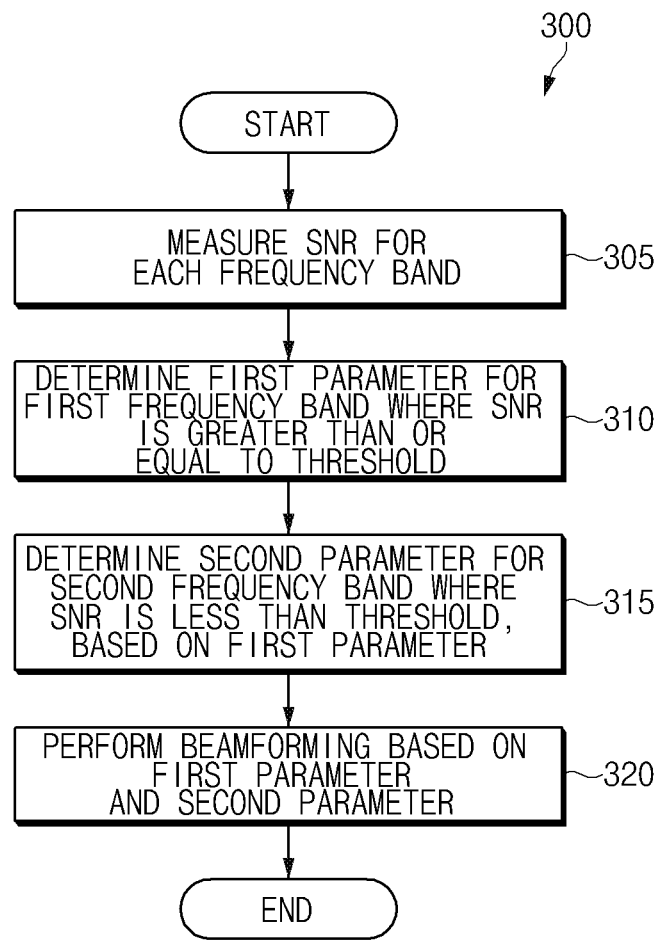
FIG. 3 illustrates an operational flowchart of an electronic device for adaptively performing beamforming based on an SNR value according to various embodiments.

FIG. 3 illustrates an operational flowchart of an electronic device for adaptively performing beamforming based on an SNR value according to various embodiments. Operations shown in FIG. 3 may be implemented by an electronic device 101 or components (e.g., a processor 120 or an audio module 170) included in the electronic device 101.

Referring to FIG. 3, in operation 305 of method 300, the processor 120 may measure an SNR for a plurality of input signals for each frequency band. According to an embodiment, the processor 120 may transform an input signal of a time domain into an input signal of a frequency domain by performing fast Fourier transform (FFT) of input signals before measuring the SNR.

In operation 310, the processor 120 may determine a first parameter for a first frequency band where the SNR value is greater than or equal to a specified threshold. According to an embodiment, the processor 120 may determine the first parameter in various manners based on a type of signal dependent beamforming.

In operation 315, the processor 120 may determine a second parameter for a second frequency band where the SNR value is less than the specified threshold, based on the first parameter. According to an embodiment, the processor 120 may determine the second parameter from the first parameter based on linearity of the first parameter or by using a DNN model.

In operation 320, the processor 120 may attenuate a noise signal from an input signal by performing beamforming based on the first parameter and the second parameter.

According to an embodiment, the processor 120 may transform a signal of a frequency domain into a signal of a time domain by performing inverse fast Fourier transform (IFFT) after performing beamforming.

Through the above-mentioned method 300, the electronic device 101 may prevent performance of signal dependent beamforming from being degraded in a frequency band where the SNR value is low.

Figure 4:
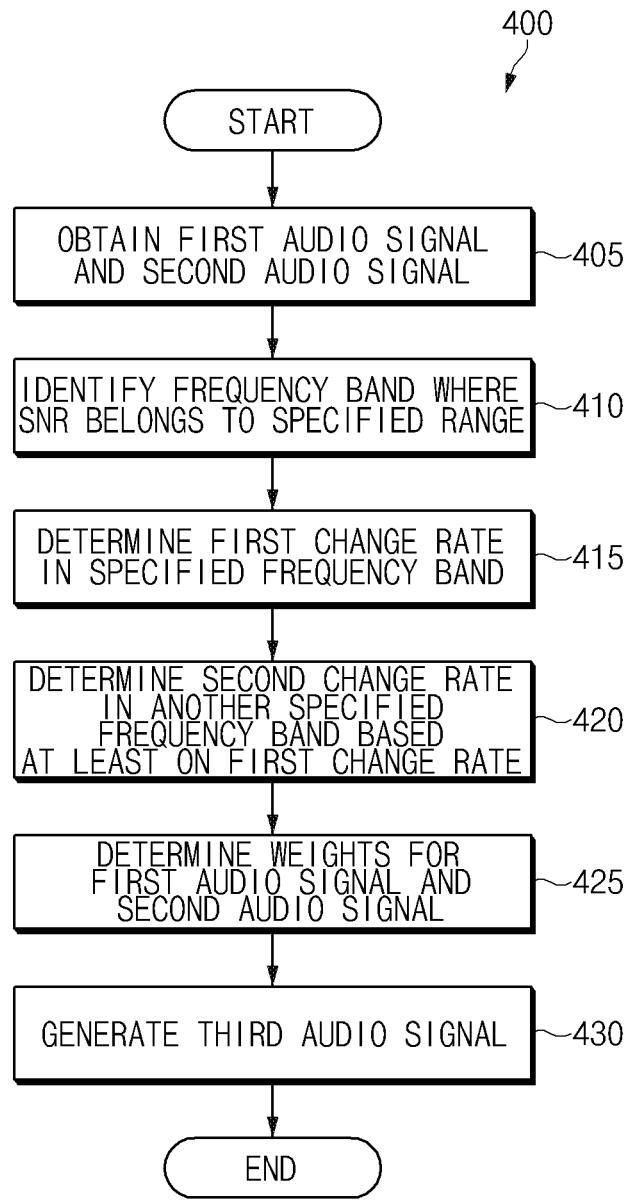
FIG. 4 illustrates an operational flowchart of an electronic device for performing beamforming in a frequency band where an SNR belongs to a specified range according to various embodiments.

FIG. 4 illustrates an operational flowchart of an electronic device for performing beamforming in a frequency band where an SNR belongs to a specified range according to various embodiments. FIG. 4 illustrates an example of receiving speech signals via two input devices, but the number of input devices and the number of speech signals are not limited to the example shown in FIG. 4.

Referring to FIG. 4, in operation 405 of method 400, a processor 120 may obtain a first audio signal via a first microphone (e.g., a first input device 210-1) and may obtain a second audio signal via a second microphone (e.g., a second input device 210-2). Each of the first audio signal and the second audio signal may include a speech signal and a noise signal.

In operation 410, the processor 120 may identify a specified frequency band where an SNR for the first audio signal and the second audio signal belongs to a specified range. For example, that the SNR belongs to the specified range may mean that the SNR is greater than or equal to a specified threshold of FIG. 2. When the SNR is greater than or equal to the specified threshold, the specified frequency band may refer to a first frequency band.

In operation 415, the processor 120 may determine a first change rate (e.g., a first parameter) at which speech signals in the specified frequency band (e.g., the first frequency band) vary in phase with frequency. According to an embodiment, the processor 120 may determine the first change rate through MVDR beamforming, max-SNR beamforming, or GSC beamforming.

In operation 420, the processor 120 may estimate a second change rate (e.g., a second parameter) at which speech signals in another frequency band different from the specified frequency band vary in phase with frequency, based at least on the first change rate determined in operation 415. The other frequency band may refer to, for example, a second frequency band where the SNR is less than the specified threshold.

According to an embodiment, the display 120 may estimate the second change rate from the first change rate using linearity of a phase difference between speech signals, each of which has directionality in the specified frequency band (e.g., the first frequency band). For another example, the processor 120 may estimate the second parameter from the first parameter based on a deep neural networks (DNN) model.

In operation 425, the processor 120 may determine a first weight for the first audio signal and a second weight for the second audio signal based at least on the first change rate and the second change rate.

In operation 430, the processor 120 may generate a third audio signal in which noise signals of the first audio signal and the second audio signal are attenuated, based at least on the first weight and the second weight.

Figure 5:
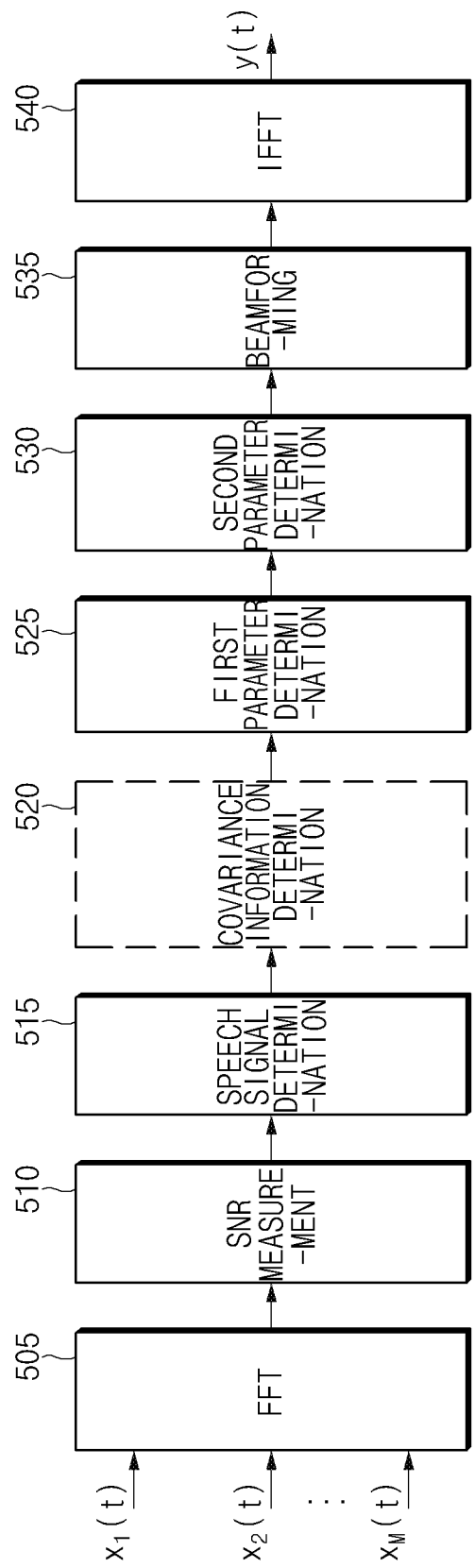
FIG. 5 illustrates a block diagram of an electronic device for performing signal dependent beamforming in a second frequency band according to various embodiments.

FIG. 5 illustrates a block diagram of an electronic device for performing signal dependent beamforming in a second frequency band according to various embodiments. FIG. 5 illustrates an example where an electronic device 101 executes a series of operations of blocks 505 to 540, but at least one of blocks shown in FIG. 5 may be omitted. For example, the electronic device 101 may omit an operation of block 520.

Referring to FIG. 5, in block 505, the electronic device 101 may transform a signal of a time domain into a signal of a frequency domain by performing FFT of a plurality of input signals. Although not illustrated in FIG. 5, the electronic device 101 may perform analog to digital (A/D) conversion or window filtering of the input signals before performing the FFT.

In block 510, the electronic device 101 may measure an SNR for the input signals for each frequency band. According to an embodiment, the electronic device 101 may determine an SNR value using an NS algorithm for one input device or an NS algorithm for a plurality of input devices. The electronic device 101 may adaptively perform signal dependent beamforming based on whether the SNR value is greater than or equal to a specified threshold.

In block 515, the electronic device 101 may determine a speech signal in a first frequency band where the SNR value is greater than or equal to the threshold. For example, the electronic device 101 may determine whether there is a speech signal in the first frequency band or may estimate a probability that a speech signal will be present in the first frequency band. According to an embodiment, the electronic device 101 may determine a speech signal using an SPP estimation algorithm or a CGMM based estimation algorithm.

In block 520, the electronic device 101 may determine covariance information of a speech signal or a noise signal in the first frequency band. For example, when an input signal x(t) received via a plurality of input devices 210-1, 210-2, . . . , and 210-M is represented as a matrix for time and frequency, it may be indicated as Equation 3 below.

$$X(t,f)=[X_1(t,f),X_2(t,f),\ldots,X_M(t,f)]^T \quad \text{[Equation 3]}$$

In Equation 3, $X_i(t,f)$ may refer to a matrix of the input signal received via the $i^{th}$ input device 210-i at time t and frequency f. $[\ ]^T$ may refer to a transposed matrix of matrix $[\ ]$. The electronic device 101 may determine a covariance matrix as Equation 4 below using a matrix X(t,f) about an input signal and a speech signal value m(t,f) (where m(t,f) may refer to a scalar value) determined in block 515.

$$C_s(f)=E\{m(t,f)X(t,f)X(t,f)^H\}$$

$$C_n(f)=E\{1-m(t,f)X(t,f)X(t,f)^H\} \quad \text{[Equation 4]}$$

In Equation 4, $C_s(f)$ may refer to a covariance matrix of the speech signal at time t and frequency f. $C_s(f)$ may refer to a covariance matrix of the noise signal at time t and frequency f. $E\{\ \}$ may refer to an average for a time of $\{\ \}$, and $[\ ]^H$ may refer to a Hermitian matrix of matrix $[\ ]$. In the determined covariance matrix, a diagonal matrix component may include information about a level of a speech signal or a noise signal, and a component except for the diagonal matrix component may include spatial information of the speech signal or the noise signal. Equations 3 and 4 may indicate an example for determining a covariance matrix of the speech signal or the noise signal. The electronic device 101 may determine a covariance matrix or a covariance vector using another method except for Equations 3 and 4.

In block 525, the electronic device 101 may determine a first parameter for the first frequency band based on the determined covariance matrix.

According to an embodiment, the electronic device 101 may use MVDR beamforming, max-SNR beamforming, GSC beamforming, or the like to improve an SNR for a speech signal. For example, the electronic device 101 may determine the first parameter using MVDR beamforming as described in Equation 5 below.

$$C_n(f)^{-1}C_s(f)F_{SNR}(f) = \lambda_{max,M} F_{SNR}(f) \qquad \text{[Equation 5]}$$

In Equation 5, $F_{MVDR}(f)$ may refer to an eigenvector with a maximum eigenvalue λmax,M of ($C_s(f)$–$C_n(f)$). The electronic device 101 may determine the eigenvector $F_{MVDR}(f)$ as the first parameter for the first frequency band.

For another example, the electronic device 101 may determine the first parameter using max-SNR beamforming as described in Equation 6 below.

$$C_n(f)^{-1}C_s(f)F_{SNR}(f) = \lambda_{max,S} F_{SNR}(f) \qquad \text{[Equation 6]}$$

In Equation 6, $F_{SNR}(f)$ may refer to an eigenvector with a maximum eigenvalue λmax,S of $C_n(f)^{-1}C_s(f)$. The electronic device 101 may determine the eigenvector $F_{SNR}(f)$ as the first parameter for the first frequency band.

For another example, the electronic device 101 may determine the first parameter using GSC beamforming as described in Equation 7 below.

$$F_{BM,SNR}(f) = 1 - \frac{C_n(f)F_{SNR}(f)F_{SNR}^H(f)}{F_{SNR}^H(f)C_n(f)F_{SNR}(f)} \qquad \text{[Equation 7]}$$

In Equation 7, $F_{SNR}(f)$ may refer to an eigenvector $F_{SNR}(f)$ determined using max-SNR beamforming of Equation 6. The electronic device 101 may determine $F_{BM,SNR}(f)$ determined using a null space of $F_{SNR}(f)$ and Equation 7 as the first parameter for the first frequency band.

According to an embodiment, the electronic device 101 may determine the first parameter using another beamforming other than MVDR beamforming, max-SNR beamforming, and GSC beamforming.

In block 530, the electronic device 101 may determine a second parameter for a second frequency band based on the first parameter. According to an embodiment, the electronic device 101 may estimate the second parameter from the first parameter based on linearity of a phase difference between channels for a speech signal in the first frequency band or based on a DNN model. The operation of determining the second parameter based on the linearity may be described in FIG. 7.

In block 535, the electronic device 101 may perform beamforming for the second frequency band based on the second parameter. For example, the electronic device 101 may control such that input devices have directionality depending on a sound source location of a speech signal by determining a weight for each of input signals based on the second parameter and applying the determined weights to the input signals.

In block 540, the electronic device 101 may output a signal y(t) of a time domain by perform IFFT of the signal, the beamforming of which is performed.

Figure 6:
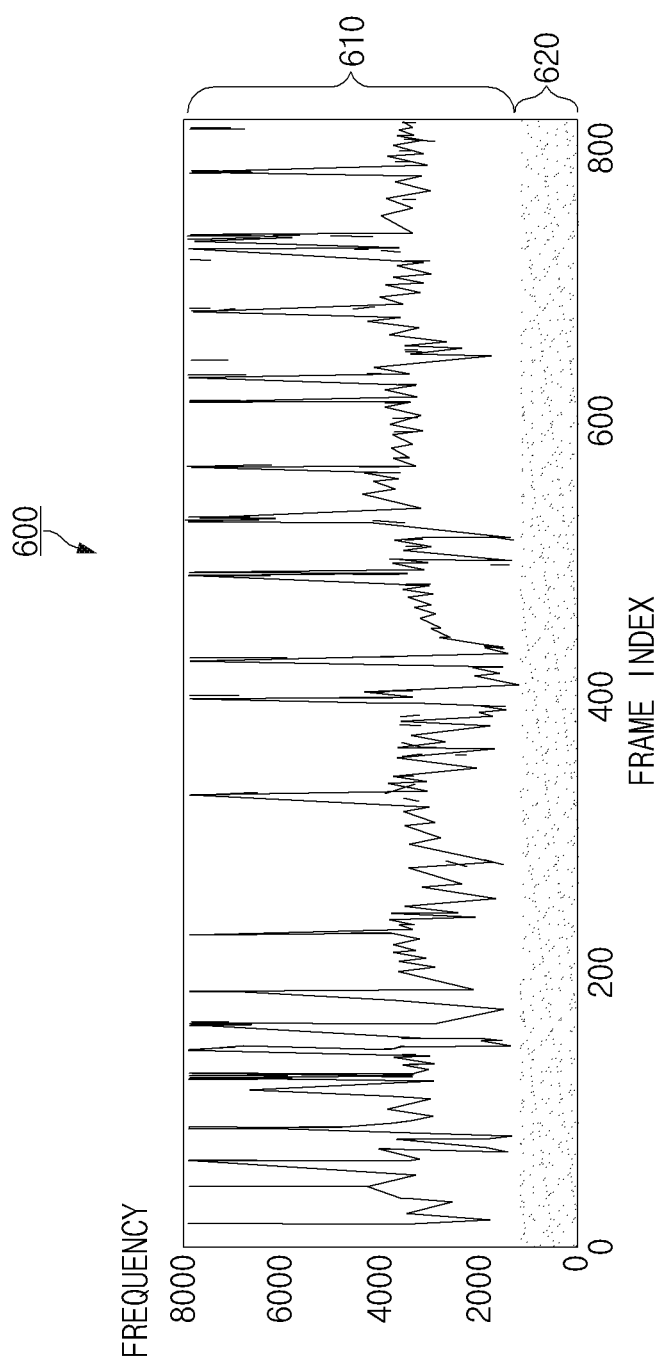
FIG. 6 illustrates a graph indicating a noise signal and a speech signal for each frequency band according to various embodiments.

FIG. 6 illustrates a graph indicating a noise signal and a speech signal for each frequency band according to various embodiments.

FIG. 6 illustrates a graph indicating a noise signal and a speech signal for each frequency band according to various embodiments. Graph 600 illustrates only an example indicating a noisy speech signal according to a specific frequency band, and an interval between a first frequency band and a second frequency band disclosed in the disclosure may not be limited to the example shown in graph 600.

Referring to FIG. 6, graph 600 may refer to a spectrogram indicating an energy of a noisy speech signal according to a time and a frequency band. The noisy speech signal may include a speech signal and a noise signal. The noisy speech signal may refer to, for example, an input signal received via input devices (e.g., input devices 210-1, 210-2, . . . , and 210-M of FIG. 2) of an electronic device 101. In graph 600, the horizontal axis may refer to a frame index indicating time and the vertical axis may refer to frequency (unit: hertz (Hz))

According to an embodiment, in a first frequency band 610 (e.g., an interval between 1000 Hz and 8000 Hz), because a noisy speech signal does not include many noise signals (i.e., because a noisy speech signal with high energy and a noisy speech signal with low energy are clearly divided), the noisy speech signal may have a high SNR value. In a second frequency band 620 (e.g., less than 1000 Hz), a noisy speech signal with high energy and a noisy speech signal with low energy may fail to be clearly divided due to a noise signal. In this case, the noisy speech signal of the second frequency band 620 may have an SNR value lower than an SNR value of the noisy speech signal of the first frequency band 610.

According to an embodiment, the electronic device 101 may identify a frequency band for adaptively determining a parameter for beamforming based on the result indicated by graph 600. For example, the electronic device 101 may determine an SNR value of an interval clearly showing a difference between SNR values (e.g., a boundary interval between the first frequency band 610 and the second frequency band 620 in graph 600) as a threshold. The electronic device 101 may store the determined threshold in a memory (e.g., a memory 130 of FIG. 1) of the electronic device 101 in advance. When a plurality of input signals are received, the electronic device 101 may divide a frequency band where the SNR is greater than or equal to the previously stored threshold and a frequency band where the SNR is less than the previously stored threshold. For another example, the electronic device 101 may measure SNRs of a plurality of frequency bands and may determine one frequency band with the highest SNR (e,g., the first frequency band 610 in graph 600). The electronic device 101 may determine a first parameter for the frequency band with the highest SNR and may determine a second parameter for the other frequency bands based on the first parameter.

Figure 7:
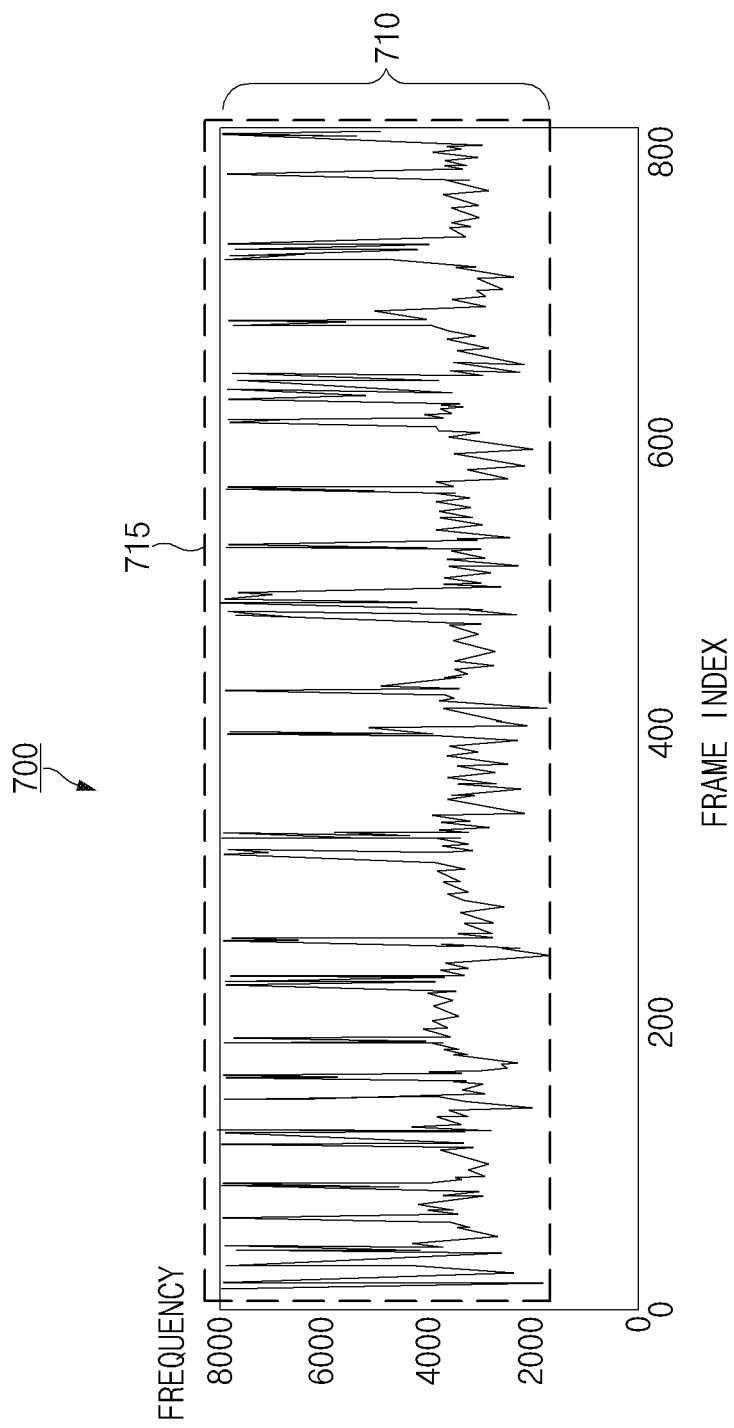
FIG. 7 illustrates a graph indicating a speech signal for each frequency band according to various embodiments.

FIG. 7 illustrates a graph indicating a speech signal for each frequency band according to various embodiments.

FIG. 7 illustrates a graph indicating a speech signal for each frequency band according to various embodiments. Graph 700 illustrates only an example indicating a speech signal according to a specific frequency band, and an interval between a first frequency band and a second frequency band disclosed in the disclosure may not be limited to the example shown in graph 700.

Referring to FIG. 7, graph 700 may represent a speech signal determined based on an SPP estimation algorithm or a CGMM based estimation algorithm according to a time and a frequency band. In graph 700, the horizontal axis may refer to a frame index indicating time and the vertical axis may refer to frequency (unit: hertz (Hz)).

According to an embodiment, an electronic device 101 may determine whether there is a speech signal in a first frequency band 710 or may determine a probability that a speech signal will be present in the first frequency band 710. For example, referring to graph 700, distribution of the speech signal may be represented in the form of reference numeral 715 in the first frequency band 710. The electronic device 101 may determine a matrix X(t,f) about an input signal based on the distribution of the speech signal shown in graph 700.

Figure 8:
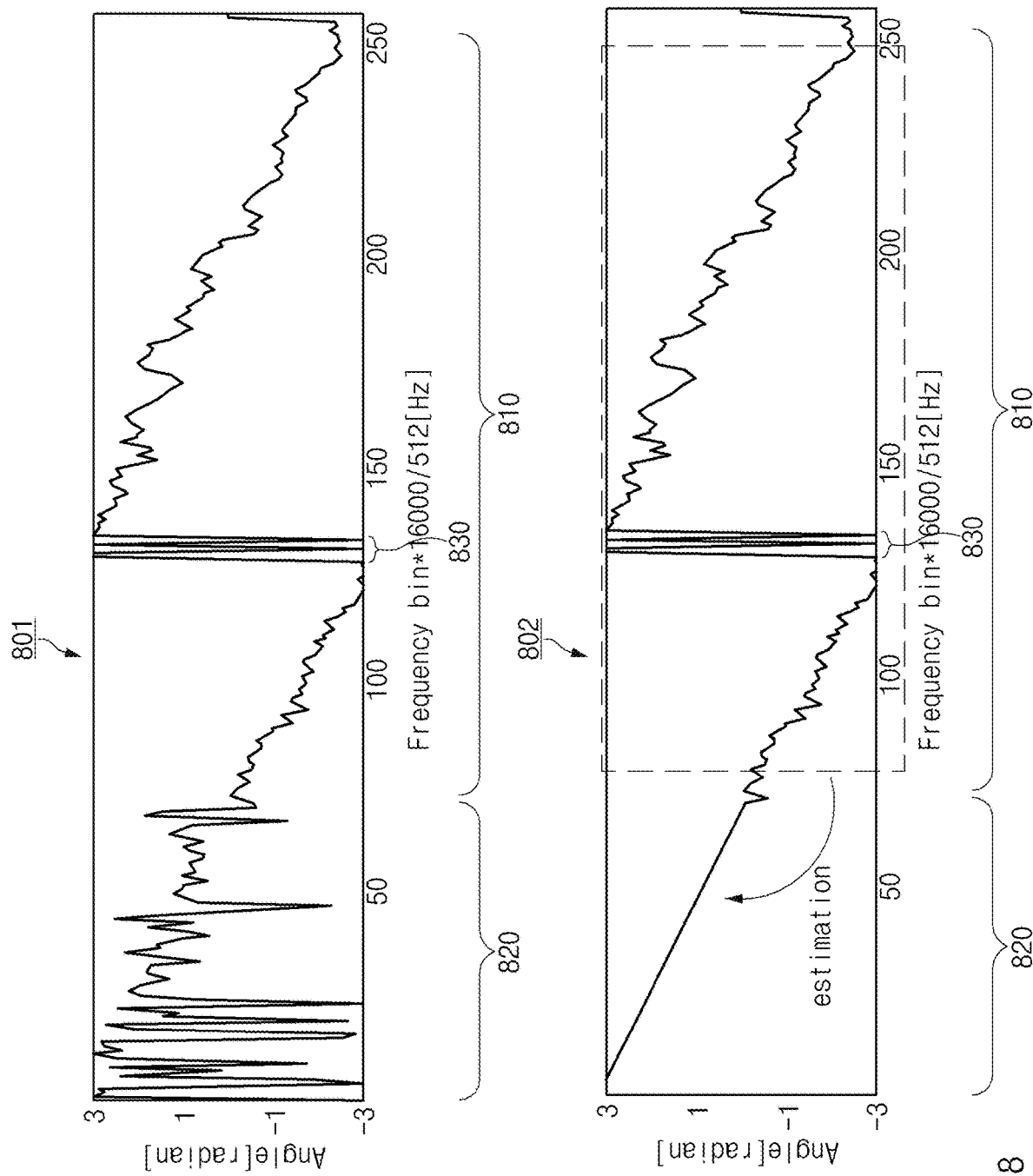
FIG. 8 illustrates an example of describing an operation of applying a first parameter to a second frequency band according to various embodiments.

FIG. 8 illustrates an example of describing an operation of applying a first parameter to a second frequency band according to various embodiments.

Referring to FIG. 8, graph 801 may represent a phase difference between speech signals in a first frequency band 810 (e.g., a first frequency band 610 of FIG. 6) and a second frequency band 820 (e.g., a second frequency band 620 of FIG. 6). In graph 801, the horizontal axis may refer to frequency bin (unit: 16000/512 Hz) and the vertical axis may refer to angle (unit: radian).

According to an embodiment, in graph 801, a slope (angle/frequency) of the graph may refer to a phase difference (i.e., a change rate) between speech signals according to a frequency change. The slope of the graph has linearity except for a third frequency band 830 where there is no phase difference between speech signals because an SNR value of an input signal is greater than or equal to a threshold in the first frequency band 810, whereas the slope of the graph may fail to be kept constant because the SNR value of the input signal is less than the threshold in the second frequency band 820.

Referring to graph 802 of FIG. 8, an electronic device 101 may determine a second parameter by applying a phase difference (i.e., the slope of the graph in the first frequency band 810) between speech signals determined based on a first parameter to a phase difference between speech signals in the second frequency bands 820. For example, when the first parameter is represented as a matrix according to a frequency band, it may be expressed as Equation 8 below.

$$F(f)=[F_1(f), F_2(f), \ldots, F_M(f)]^T \quad \text{[Equation 8]}$$

In Equation 8, $F_i(f)$ (where i is a natural number from 1 to M) may refer to the first parameter for the input signal received via the $i^{th}$ input device at the frequency f. $[\ ]^T$ may refer to a transposed matrix of matrix $[\ ]$. The first parameter represented as Equation 8 may be expressed as Equation 9 below to indicate a phase difference between channels.

$$\Delta\angle F(f)=E\{\angle F_i(f)-\angle F_{i-1}(f)\} \quad \text{[Equation 9]}$$

In Equation 9, $\Delta\angle F(f)$ may refer to a phase difference between channels in a first parameter component and $\angle F_i(f)$ (where i is a natural number from 1 to M) may refer to a phase for the input signal received via the $i^{th}$ input device at the frequency f. $E\{\ \}$ may refer to an average of $\{\ \}$.

According to another embodiment, the electronic device 101 may determine the second parameter using a DNN model. The electronic device 101 may determine $\Delta\angle F(f)$ (hereinafter, referred to as a first phase difference) indicating a phase difference between channels in an environment where there is no noise signal or an environment where the SNR is high, such as the first frequency band, and may estimate $\Delta\angle F(f)$ (hereinafter, referred to as a second phase difference) of the second frequency band where the SNR is low, from the first phase difference.

Figure 9:
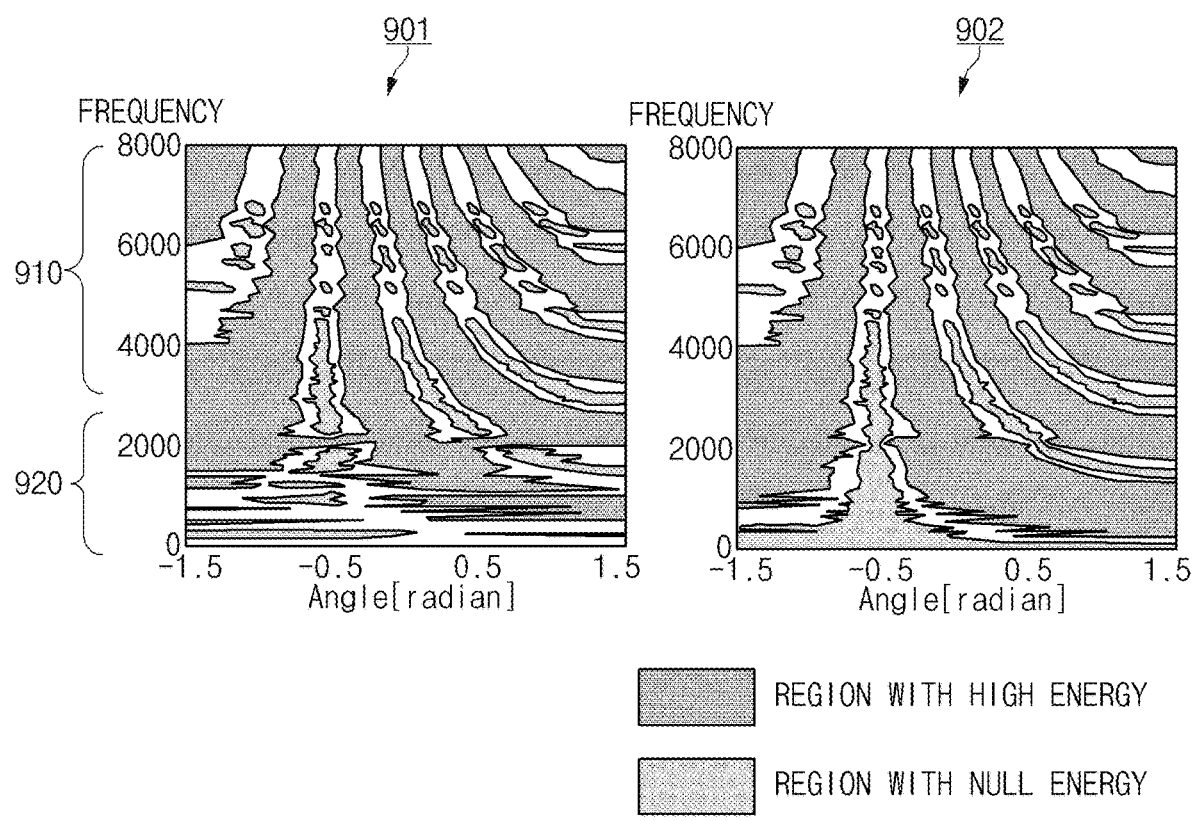
FIG. 9 illustrates a graph indicating the result of performing generalized sidelobe canceler (GSC) beamforming using a null space according to various embodiments.

FIG. 9 illustrates a graph indicating the result of performing a blocking matrix of GSC beamforming using a null space according to various embodiments. FIG. 9 illustrates only a graph indicating the result of performing the blocking matrix of the GSC beamforming, but the result of performing MVDR beamforming and max-SNR beamforming may be represented similar to that in FIG. 9.

Referring to FIG. 9, graph 901 may indicate the result of performing existing beamforming and graph 902 may indicate the result of adaptively performing beamforming depending on an SNR. In graph 901 and graph 902, the horizontal axis may refer to angle (unit: radian) and the vertical axis may refer to frequency (unit: Hz).

Referring to graph 901, a region indicating a null space of a speech signal and the other region are clearly divided in a first frequency band 910 (e.g., a first frequency band 610 of FIG. 6) where the SNR is high, whereas a region indicating a null space of a speech signal and the other region are not clearly divided in a second frequency band 920 (e.g., a second frequency band 620 of FIG. 6) where the SNR is low. Referring to graph 902, because an electronic device 101 applies a parameter of the first frequency band 910 to the second frequency band 920, the region indicating the null space of the speech signal and the other region may be clearly divided.

As described above, an electronic device (e.g., an electronic device 101 of FIG. 1) may include a plurality of input devices (e.g., a plurality of input devices 210-1, 210-2, . . . , and 210-M of FIG. 2) for receiving a plurality of input signals, each of which includes a speech signal and a noise signal, and a processor (e.g., a processor 120 of FIG. 1) electrically connected with the input devices. The processor may be configured to determine an (SNR) value for the plurality of input signals for each frequency band, determine a first parameter indicating a phase shift to frequency in the plurality of input signals in a first frequency band where the SNR value is greater than or equal to a specified threshold, determine a second parameter indicating a phase shift to frequency in the plurality of input signals in a second frequency band where the SNR value is less than the threshold, based on the first parameter, and perform beamforming for the plurality of input signals based on the first parameter and the second parameter.

According to an embodiment, the processor may be configured to determine weights for the plurality of input signals based on the first parameter and the second parameter and generate an output signal where at least some of noise signals included in the plurality of input signals are attenuated by applying the weights to the plurality of input signals, as at least a portion of the performing of the beamforming.

According to an embodiment, the processor may be configured to determine the first parameter based on a covariance matrix for a speech signal or a covariance matrix for a noise signal in the first frequency band of the plurality of input signals.

According to an embodiment, the processor may be configured to determine a probability that a speech signal will be present in each of the plurality of input signals in the first frequency band, determine a spatial matrix for the plurality of input signals in the first frequency band, determine a covariance matrix for the speech signal or a covariance matrix for the noise signal based on the spatial matrix and the probability, and determine the first parameter based on the covariance matrix for the speech signal or the covariance matrix for the noise signal.

According to an embodiment, the processor may be configured to determine the first parameter based on the covariance matrix for the speech signal, a difference between the covariance matrix for the speech signal and the covariance matrix for the noise signal, or an inverse matrix of the covariance matrix for the noise signal and the covariance matrix for the speech signal.

According to an embodiment, the processor may be configured to determine the second parameter from the first parameter by using a DNN model.

According to an embodiment, the processor may be configured to determine the probability for a single channel in the first frequency band or determine the probability for a plurality of channels in the first frequency band.

According to an embodiment, the processor may be configured to perform fast Fourier transform of the plurality of input signals.

As described above, an electronic device (e.g., an electronic device 101 of FIG. 1) may include a first microphone (e.g., an input device 210-1 of FIG. 2), a second microphone (e.g., an input device 210-2 of FIG. 2), and a processor (e.g., a processor 120 of FIG. 1). The processor may be configured to obtain a first audio signal using the first microphone and obtain a second audio signal using the second microphone, identify a specified frequency band where an SNR belongs to a specified range in conjunction with the first audio signal and the second audio signal, determine a first change rate at which the first audio signal and the second audio signal vary in phase with frequency in the specified frequency band, estimate a second change rate, at which the first audio signal and the second audio signal vary in phase with frequency in a frequency band different from the specified frequency band, based at least on the first change rate, determine a first weight corresponding to the first audio signal and a second weight corresponding to the second audio signal based at least on the first change rate and the second change rate, and generate a third audio signal, a noise signal of which is attenuated, using the first audio signal and the second audio signal, based at least on the first weight and the second weight.

According to an embodiment, the processor may be configured to determine the first change rate based at least on a covariance matrix for the first audio signal and the second audio signal in the specified frequency band.

According to an embodiment, the processor may be configured to determine a presence probability value for a speech signal included in at least one of the first audio signal and the second audio signal in the specified frequency band and determine the covariance matrix based on the presence probability value.

According to an embodiment, the processor may be configured to determine the first change rate based on a difference between a covariance matrix for a speech signal and a covariance matrix for a noise signal in the first audio signal and the second audio signal.

According to an embodiment, the processor may be configured to estimate the second change rate from the first change rate by using a DNN model.

According to an embodiment, the processor may be configured to estimate the second change rate based at least on linearity of the first change rate.

According to an embodiment, the processor may be configured to perform FFT of the first audio signal and the second audio signal.

As described above, a method of an electronic device may include receiving a plurality of input signals, determining an SNR value for the plurality of input signals for each frequency band, determining a first parameter indicating a phase shift to frequency in the plurality of input signals in a first frequency band where the SNR value is greater than or equal to a specified threshold, determining a second parameter indicating a phase shift to frequency in the plurality of input signals in a second frequency band where the SNR value is less than the threshold, based on the first parameter, and performing beamforming for the plurality of input signals based on the first parameter and the second parameter.

According to an embodiment, the determining of the first parameter may include determining the first parameter based on a covariance matrix for a speech signal or a covariance matrix for a noise signal in the first frequency band of the plurality of input signals. The performing of the beamforming may include determining weights for the plurality of input signals based on the second parameter and generating an output signal where noise signals of the plurality of input signals are attenuated by applying the weights to the plurality of input signals.

According to an embodiment, the determining of the first parameter may include determining a probability that a speech signal will be present in each of the plurality of input signals in the first frequency band, determining a spatial matrix for the plurality of input signals in the first frequency band, determining a covariance matrix for the speech signal or a covariance matrix for the noise signal based on the spatial matrix and the probability, and determining the first parameter based on the covariance matrix for the speech signal or the covariance matrix for the noise signal.

According to an embodiment, the determining of the first parameter may include determining the first parameter based on the covariance matrix for the speech signal, a difference between the covariance matrix for the speech signal and the covariance matrix for the noise signal, or an inverse matrix of the covariance matrix for the noise signal and the covariance matrix for the speech signal.

According to an embodiment, the determining of the second parameter may include determining the second parameter from the first parameter by using a DNN model.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
   a plurality of input devices configured to receive a plurality of input signals, each of which includes a speech signal and a noise signal; and
   a processor electrically connected with the input devices, wherein the processor is configured to:
   determine a signal to noise ratio (SNR) value for the plurality of input signals for each of a plurality of frequency bands;
   determine a first parameter indicating a phase shift in frequency in the plurality of input signals in a first frequency band where the SNR value is greater than or equal to a specified threshold;
   determine a second parameter indicating a phase shift in frequency in the plurality of input signals in a second frequency band where the SNR value is less than the specified threshold, based on the first parameter; and
   perform beamforming for the plurality of input signals based on the first parameter and the second parameter.

2. The electronic device of claim 1, wherein the processor is configured to:
   determine weights for the plurality of input signals based on the first parameter and the second parameter and generate an output signal where at least some of noise signals included in the plurality of input signals are attenuated by applying the weights to the plurality of input signals, as at least a portion of the performing of the beamforming.

3. The electronic device of claim 1, wherein the processor is configured to:
   determine the first parameter based on a covariance matrix for the speech signal or a covariance matrix for the noise signal in the first frequency band of the plurality of input signals.

4. The electronic device of claim 1, wherein the processor is configured to:
   determine a probability that the speech signal will be present in each of the plurality of input signals in the first frequency band;
   arrange the plurality of input signals in the first frequency band into a first matrix;
   determine a covariance matrix for the speech signal or a covariance matrix for the noise signal based on the first matrix and the probability; and
   determine the first parameter based on the covariance matrix for the speech signal or the covariance matrix for the noise signal.

5. The electronic device of claim 4, wherein the processor is configured to:
   determine the first parameter based on the covariance matrix for the speech signal, a difference between the covariance matrix for the speech signal and the covariance matrix for the noise signal, or an inverse matrix of the covariance matrix for the noise signal and the covariance matrix for the speech signal.

6. The electronic device of claim 1, wherein the processor is configured to:
   determine the second parameter from the first parameter by using a deep neural networks (DNN) model.

7. The electronic device of claim 4, wherein the processor is configured to:
   determine the probability for a single channel in the plurality of input signals in the first frequency band or determine the probability for a plurality of channels in the plurality of input signals in the first frequency band.

8. The electronic device of claim 1, wherein the processor is configured to:
   perform fast Fourier transform of the plurality of input signals.

9. An electronic device, comprising:
a first microphone;
a second microphone; and
a processor,
wherein the processor is configured to:
obtain a first audio signal using the first microphone and obtain a second audio signal using the second microphone;
identify a specified frequency band where a signal to noise ratio (SNR) belongs to a specified range in conjunction with the first audio signal and the second audio signal;
determine a first change rate at which the first audio signal and the second audio signal vary in phase with frequency in the specified frequency band;
estimate a second change rate, at which the first audio signal and the second audio signal vary in phase with frequency in a frequency band different from the specified frequency band, based at least on the first change rate;
determine a first weight corresponding to the first audio signal and a second weight corresponding to the second audio signal based at least on the first change rate and the second change rate; and
generate a third audio signal, a noise signal of which is attenuated, using the first audio signal and the second audio signal, based at least on the first weight and the second weight.

10. The electronic device of claim 9, wherein the processor is configured to:
determine the first change rate based at least on a covariance matrix for the first audio signal and the second audio signal in the specified frequency band.

11. The electronic device of claim 10, wherein the processor is configured to:
determine a presence probability value for a speech signal included in at least one of the first audio signal and the second audio signal in the specified frequency band; and
determine the covariance matrix based on the presence probability value.

12. The electronic device of claim 9, wherein the processor is configured to:
determine the first change rate based on a difference between a covariance matrix for a speech signal and a covariance matrix for a noise signal in the first audio signal and the second audio signal.

13. The electronic device of claim 9, wherein the processor is configured to:
estimate the second change rate from the first change rate by using a DNN model.

14. The electronic device of claim 9, wherein the processor is configured to:
estimate the second change rate based at least on linearity of the first change rate.

15. The electronic device of claim 11, wherein the processor is configured to:
perform FFT of the first audio signal and the second audio signal.

* * * * *